H. BECK.
ELECTRIC ARC LAMP.
APPLICATION FILED NOV. 14, 1906.

959,045.

Patented May 24, 1910.

Attest:
Herman Meyer
Alan McDonell.

Heinrich Beck, Inventor:
by William R. Baird
his Atty.

UNITED STATES PATENT OFFICE.

HEINRICH BECK, OF FRANKFORT-ON-THE-MAIN, GERMANY, ASSIGNOR TO BECK FLAMING LAMP COMPANY, OF CANTON, NEW YORK, A CORPORATION OF NEW YORK.

ELECTRIC-ARC LAMP.

959,045.  Specification of Letters Patent.  Patented May 24, 1910.

Application filed November 14, 1906. Serial No. 343,450.

*To all whom it may concern:*

Be it known that I, HEINRICH BECK, a subject of the German Emperor, residing at Frankfort-on-the-Main, Germany, have invented certain new and useful Improvements in Electric-Arc Lamps, of which the following is a specification.

My invention relates to electric arc lamps and more particularly to the carbon holders thereof and its novelty consists in the construction and adaptation of the parts as will be more fully hereinafter pointed out.

In Letters Patent of the United States No. 795,681, granted to me July 25, 1905, I have described a lamp, which among other instrumentalities, comprises an electrode provided with a longitudinal rib or ridge and a lateral support for the said rib so that the electrode rests on this support while the lamp is in operation. My present invention is an improvement upon the form of support for the electrode disclosed in that patent and in brief consists in making the electrode support movable, removable and adjustable with respect to its electrode, so that in case of injury to the support either a fresh surface can be presented to the electrode or the old support may be removed and a new support can be at once put in its place without disorganizing the other parts of the lamp, while at the same time the support may be adjusted to move the electrode a variable distance from a fixed point on the framework.

Figure 1:
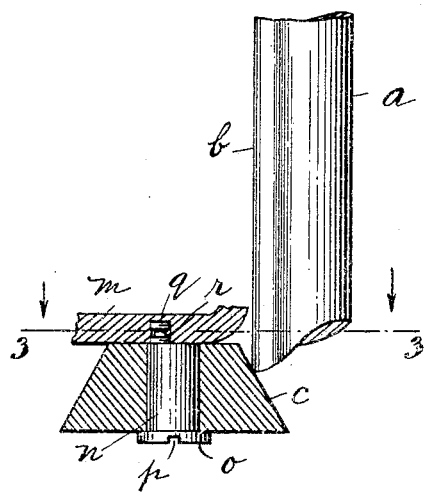
Figure 2:
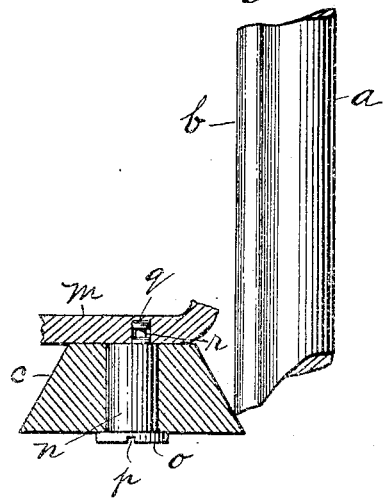
Figure 3:
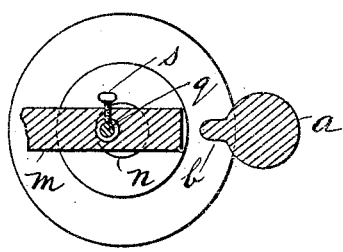
Figure 4:
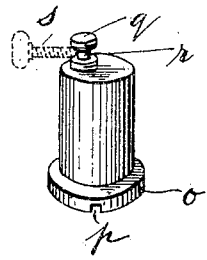
Figure 5:
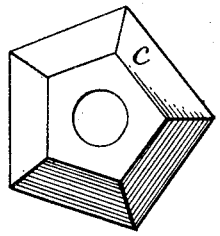
Figure 6:
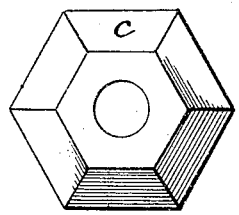

In the drawings, Figure 1 represents in elevation a portion of the lamp showing the lower part of an electrode, my improved support with part of the framework of the lamp to which the support is secured, all non-essential parts being omitted; Fig. 2 is a similar view showing the electrode support rotated to move the electrode farther away from the framework; Fig. 3 is a plan view of the parts below the plane of the line 3—3 in Fig. 1; Fig. 4 is a perspective of the electrode support bolt and its set screw; Fig. 5 is a plan view of a modification of the electrode support when it is made in the form of a frustum of a pyramid with five sides; Fig. 6 is a view similar to Fig. 5 showing a frustum of a pyramid of six sides and Fig. 7 is a perspective of a conical support having its screw teat made integral therewith.

In the drawings, $a$ represents an electrode suitably supported against lateral displacement in a holder (not shown) in the manner described in Letters Patent above referred to. It is provided with a longitudinal rib or ridge $b$ and rests by gravity upon the support $c$ which is secured to and projects from any suitable carrying element therefor, as the framework $m$ of the lamp for example. The support $c$ is preferably made of metal or a suitable fireproof material or of carbon. It is preferably made of symmetrical form with respect to its vertical axis, for instance, in the form of the frustum of a cone, as shown in Figs. 1 and 2, or in the form of a frustum of a pyramid, as shown in Figs. 5 and 6, so that it presents externally a downwardly sloping surface upon which the rib $b$ of the electrode is adapted to rest. The support is centrally apertured to permit of the passage of a bolt $n$ having a head $o$ slitted at $p$ and which terminates in a threaded teat $q$ adapted to engage in a threaded aperture formed for that purpose in the framework $m$. The teat $q$ is eccentrically placed with respect to the center of the bolt $n$ and it is provided with an annular groove $r$, adapted to receive the point of a set screw $s$ also passing through a threaded aperture in the framework $m$ by means of which the teat and consequently the bolt may be held in place after adjustment.

It will be apparent that the means herein described provide two distinct adjustments for the support, namely:—a rotative one around the bolt $n$, by which a different portion of the surface thereof is brought into supporting relation with the arcing end of the electrode, without affecting the extent of projection of the support with respect to the frame-work, or, in other words, without affecting lateral adjustment of one electrode relatively to the other; and, an adjustment by means of the eccentrically placed teat, whereby the position of the supporting surface relatively to the frame, is charged. By means of these two adjustments of this frustum shaped support, and the possibility of combining the same, a multiplicity of changes is possible.

Figure 7:
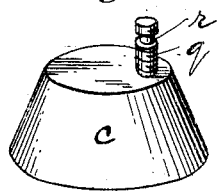

Provided the support $c$ is made of the proper material, it is, of course, possible to make the teat $q$ integral with the support itself and omit the bolt, such a construction being shown in Fig. 7.

What I claim as new is:—

1. In an apparatus of the kind described, a conoidal electrode support, the external surface of which engages the electrode and a pivot having connection with the support and arranged eccentric to the axis thereof.

2. In an apparatus of the kind described, downwardly-extending electrode, a carrier, and an electrode support having a conoidal portion engaged with the lower end of the electrode and a pivot arranged eccentric to the axis of said conoidal portion and connecting the support to the carrier.

3. In an apparatus of the kind described, a support for an electrode, having a frustum shaped portion adapted externally to engage the electrode and provided with an eccentrically placed teat for connecting it with a suitable carrier and whereby it is adapted to be adjusted relatively to the electrode supported by it, for the purpose set forth.

4. In an apparatus of the kind described, the combination of a carrier, and an electrode support connected therewith and having a plurality of independent adjustments, one of which is eccentric, said electrode support provided with a downwardly sloping external wall to engage the electrode.

5. In an apparatus of the kind described, the combination of a carrier and a conoidal electrode support the outer tapered surface of which is adapted to engage the electrode, and means for connecting the support with the carrier, adapted to provide a plurality of independent adjustments, one of which is eccentric to the axis of the support and another of which is around the center of the same.

6. In an apparatus of the kind described, a carrier, an electrode support having a downwardly sloping external wall, and an element extending through the center of the support and carrying the same, said element and support being rotatably movable relatively to each other, and means for connecting said element to the carrier, eccentrically placed with relation to the former.

7. In an apparatus of the kind described, a carrier, an electrode support having a downwardly sloping external wall, and a bolt extending through the center of the support, said bolt and support being movable rotatively with relation to each other, and a teat eccentrically placed with respect to the bolt and projecting therefrom and connecting the same with the carrier.

8. In an apparatus of the kind described, a carrier, an electrode support of frustum shape having an eccentrically placed projection engaging the carrier, and means engaging said projection, for removably securing connecting the same with the carrier.

9. In an apparatus of the kind described, a carrier, an electrode support of frustum shape, means by which the support is rotatably mounted, arranged in the center thereof, an eccentrically placed projection from the support, engaging the carrier, and securing means engaging said projection.

10. In an apparatus of the kind described, an apertured carrier, an electrode support of frustum shape, a removable supporting bolt upon which the same is rotatably mounted, said bolt extending through the center of the support and provided with means for attaching it to the carrier, comprising a teat which extends into the aperture of the latter and is arranged off the center of the support.

11. In an apparatus of the kind described, a relatively-movable conoidal electrode-support and a supporting means therefor, having a portion which is eccentric to the axis of the electrode, whereby the lateral position of the electrode is varied in the relative movement of the parts.

In testimony whereof I affix my signature in presence of two witnesses.

HEINRICH BECK.

Witnesses:
JEAN GRUND,
CARL GRUND.